United States Patent
Gurumallappa et al.

(10) Patent No.: US 11,021,409 B2
(45) Date of Patent: Jun. 1, 2021

(54) EXTRUDED FERTILIZER GRANULES WITH UREASE AND/OR NITRIFICATION INHIBITORS

(71) Applicant: SABIC GLOBAL TECHNOLOGIES B.V., Bergen Op Zoom (NL)

(72) Inventors: Yoganand Gurumallappa, Bangalore (IN); Ravi Hegde, Bangalore (IN); Satish Burla, Bangalore (IN); Rajamalleswaramma Koripelly, Bangalore (IN); Samik Gupta, Bangalore (IN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 16/636,391

(22) PCT Filed: Aug. 7, 2018

(86) PCT No.: PCT/IB2018/055946
§ 371 (c)(1),
(2) Date: Feb. 4, 2020

(87) PCT Pub. No.: WO2019/030671
PCT Pub. Date: Feb. 14, 2019

(65) Prior Publication Data
US 2020/0172447 A1    Jun. 4, 2020

Related U.S. Application Data
(60) Provisional application No. 62/543,121, filed on Aug. 9, 2017.

(51) Int. Cl.
*C05C 9/00* (2006.01)
*C05G 5/12* (2020.01)
(Continued)

(52) U.S. Cl.
CPC .............. *C05C 9/005* (2013.01); *C05G 3/90* (2020.02); *C05G 5/12* (2020.02); *C05G 5/40* (2020.02)

(58) Field of Classification Search
None
See application file for complete search history.

(56) References Cited

U.S. PATENT DOCUMENTS
3,056,723 A   10/1962  Galloway
3,232,740 A   2/1966   Sor et al.
(Continued)

FOREIGN PATENT DOCUMENTS
AU   2015212412   9/1916
AU       667645   2/1995
(Continued)

OTHER PUBLICATIONS
Al-Kanani et al., "Volatilization of ammonia from urea-ammonium nitrate solutions as influenced by organic and inorganic additives." *Fertilizer research* 1990, 23, 113-119.
(Continued)

*Primary Examiner* — Wayne A Langel
(74) *Attorney, Agent, or Firm* — Norton Rose Fulbright US LLP (57) ABSTRACT

Fertilizers with urease inhibitors and/or nitrification inhibitors are described. The fertilizer can include an extruded granule containing urea, a polymeric binder, and a nitrification inhibitor and/or an urease inhibitor.

20 Claims, 2 Drawing Sheets

(51) Int. Cl.
  *C05G 5/40* (2020.01)
  *C05G 3/90* (2020.01)

(56) References Cited

U.S. PATENT DOCUMENTS

| | | | |
|---|---|---|---|
| 3,300,294 A | 1/1967 | Hollstein | |
| 3,314,778 A | 4/1967 | Campbell et al. | |
| 3,322,528 A | 5/1967 | Hamamoto | |
| 3,326,665 A | 7/1967 | Schäfer et al. | |
| 3,331,677 A | 7/1967 | Campbell et al. | |
| 3,388,989 A | 6/1968 | Sor | |
| 3,400,011 A | 9/1968 | Fox | |
| 3,441,539 A | 4/1969 | Schafer et al. | |
| 3,499,748 A | 3/1970 | Fraser | |
| 3,825,414 A | 6/1974 | Lee et al. | |
| 3,870,755 A | 3/1975 | Kamo et al. | |
| 3,954,436 A | 5/1976 | Vad et al. | |
| 3,961,329 A | 7/1976 | Naidich | |
| 3,962,329 A | 7/1976 | Schoenaich et al. | |
| 4,062,890 A | 12/1977 | Shank | |
| 4,082,533 A | 4/1978 | Wittenbrook et al. | |
| 4,880,455 A | 11/1989 | Blank | |
| 4,994,100 A | 2/1991 | Sutton et al. | |
| 5,124,451 A | 7/1992 | Hackl et al. | |
| 5,169,954 A | 12/1992 | Hackl et al. | |
| 5,219,465 A | 6/1993 | Goertz et al. | |
| 5,264,019 A | 11/1993 | Gossett, Jr. et al. | |
| 5,300,135 A | 4/1994 | Hudson et al. | |
| 5,352,265 A | 10/1994 | Weston et al. | |
| 5,399,186 A | 3/1995 | Derrah et al. | |
| 5,405,426 A | 4/1995 | Timmons | |
| 5,414,083 A | 5/1995 | Hackl et al. | |
| 5,466,274 A | 11/1995 | Hudson et al. | |
| 5,476,528 A | 12/1995 | Trimm | |
| 5,597,917 A | 1/1997 | Hackl et al. | |
| 5,645,624 A | 7/1997 | Naka et al. | |
| 5,741,521 A | 4/1998 | Knight et al. | |
| 5,803,946 A | 9/1998 | Petcavich et al. | |
| 5,851,261 A | 12/1998 | Markusch et al. | |
| 5,862,610 A | 1/1999 | Lipert | |
| 5,917,110 A | 6/1999 | Kust | |
| 5,976,210 A | 11/1999 | Sensibaugh | |
| 6,048,376 A | 4/2000 | Miller | |
| 6,048,378 A | 4/2000 | Moore | |
| 6,231,633 B1 | 5/2001 | Hirano et al. | |
| 6,391,454 B1 | 5/2002 | Mao et al. | |
| 6,500,223 B1 | 12/2002 | Sakai et al. | |
| 6,576,035 B2 | 6/2003 | Hartmann et al. | |
| 6,749,659 B1 | 6/2004 | Yu et al. | |
| 6,900,162 B2 | 5/2005 | Wertz et al. | |
| 6,936,573 B2 | 8/2005 | Wertz et al. | |
| 6,936,681 B1 | 8/2005 | Wertz et al. | |
| 7,213,367 B2 | 5/2007 | Wertz et al. | |
| 8,163,058 B2 | 4/2012 | Whitehurst | |
| 8,419,819 B2 | 4/2013 | Sutton | |
| 8,603,211 B2 | 12/2013 | Rahn et al. | |
| 9,034,072 B2 | 5/2015 | Gabrielson et al. | |
| 9,376,350 B2 | 6/2016 | Pursell et al. | |
| 9,394,210 B2 | 7/2016 | Gabrielson et al. | |
| 9,422,203 B2 | 8/2016 | Waliwitiya | |
| 9,446,993 B2 | 9/2016 | Li et al. | |
| 2003/0224031 A1 | 12/2003 | Heier et al. | |
| 2004/0001884 A1 | 1/2004 | Moroni et al. | |
| 2004/0016275 A1 | 1/2004 | Hartmann et al. | |
| 2004/0016276 A1 | 1/2004 | Wynnyk et al. | |
| 2004/0050127 A1 | 3/2004 | Ambri | |
| 2004/0163434 A1 | 8/2004 | Quin | |
| 2004/0182953 A1 | 9/2004 | Knoer | |
| 2006/0089259 A1 | 4/2006 | Driessen et al. | |
| 2006/0142157 A1 | 6/2006 | Birthisel et al. | |
| 2009/0270257 A1 | 10/2009 | Pursell et al. | |
| 2009/0317468 A1* | 12/2009 | Letmathe | C05G 5/40 424/484 |
| 2010/0011825 A1 | 1/2010 | Ogle et al. | |
| 2010/0139348 A1 | 6/2010 | Wan et al. | |
| 2011/0036009 A1 | 2/2011 | Bissonnette et al. | |
| 2011/0154873 A1* | 6/2011 | Burnham | C05G 3/00 71/8 |
| 2011/0275520 A1 | 11/2011 | Frey et al. | |
| 2012/0017659 A1 | 1/2012 | Pursell et al. | |
| 2012/0067094 A1 | 3/2012 | Pursell et al. | |
| 2012/0090366 A1 | 4/2012 | Pursell et al. | |
| 2013/0152649 A1 | 6/2013 | Kweeder et al. | |
| 2013/0231493 A1 | 9/2013 | Shishkov et al. | |
| 2013/0305796 A1 | 11/2013 | Hudson et al. | |
| 2014/0033779 A1 | 2/2014 | Bertin et al. | |
| 2014/0047884 A1 | 2/2014 | Gabrielson et al. | |
| 2014/0102156 A1 | 4/2014 | Pursell et al. | |
| 2014/0223978 A1 | 8/2014 | Kuo et al. | |
| 2014/0230322 A1* | 8/2014 | Zhang | C05G 3/00 47/32.8 |
| 2014/0255605 A1 | 9/2014 | Van Kaathoven et al. | |
| 2015/0031786 A1 | 1/2015 | Lambeth | |
| 2015/0047402 A1* | 2/2015 | Walker | C05D 3/02 71/10 |
| 2015/0052960 A1 | 2/2015 | Makin et al. | |
| 2015/0101379 A1 | 4/2015 | Gabrielson et al. | |
| 2015/0125639 A1 | 5/2015 | Rosen | |
| 2015/0152017 A1 | 6/2015 | Schumski et al. | |
| 2015/0197460 A1 | 7/2015 | Gabrielson et al. | |
| 2015/0239790 A1 | 8/2015 | Iwig et al. | |
| 2015/0291481 A1 | 10/2015 | Neff et al. | |
| 2016/0075609 A1 | 3/2016 | Gabrielson et al. | |
| 2016/0076062 A1 | 3/2016 | Medoff et al. | |
| 2016/0185682 A1* | 6/2016 | Katz | C05C 11/00 71/28 |
| 2016/0340265 A1 | 11/2016 | Kanagalingam et al. | |
| 2017/0088480 A1 | 3/2017 | Kannan et al. | |
| 2017/0362139 A1* | 12/2017 | Zhang | C05C 11/00 |
| 2018/0022661 A1 | 1/2018 | Achille et al. | |
| 2018/0208513 A1* | 7/2018 | Kanagalingam | C05G 5/40 |
| 2018/0208519 A1* | 7/2018 | Kanagalingam | C05C 9/005 |
| 2018/0297903 A1 | 10/2018 | Ledoux et al. | |
| 2020/0039893 A1* | 2/2020 | Koripelly | C05G 5/40 |
| 2020/0131098 A1* | 4/2020 | Hegde | C05G 3/90 |
| 2020/0140353 A1* | 5/2020 | Hegde | C05C 9/00 |

FOREIGN PATENT DOCUMENTS

| | | |
|---|---|---|
| CA | 2441175 | 3/2004 |
| CA | 2701995 | 10/2011 |
| CN | 1126465 | 7/1996 |
| CN | 1145059 | 3/1997 |
| CN | 1666972 | 9/2005 |
| CN | 1298679 | 2/2007 |
| CN | 101037371 | 9/2007 |
| CN | 101134697 | 3/2008 |
| CN | 101177365 | 5/2008 |
| CN | 101289350 | 10/2008 |
| CN | 101289353 | 10/2008 |
| CN | 101323545 | 12/2008 |
| CN | 101723752 | 6/2010 |
| CN | 102143927 | 8/2011 |
| CN | 102267842 | 12/2011 |
| CN | 102295491 | 12/2011 |
| CN | 102432388 | 5/2012 |
| CN | 102557838 | 7/2012 |
| CN | 102826917 | 12/2012 |
| CN | 102951968 | 3/2013 |
| CN | 103319120 | 9/2013 |
| CN | 103755498 | 4/2014 |
| CN | 103772074 | 5/2014 |
| CN | 103787798 | 5/2014 |
| CN | 103102216 | 12/2014 |
| CN | 104177201 | 12/2014 |
| CN | 104230575 | 12/2014 |
| CN | 104261723 | 1/2015 |
| CN | 104276877 | 1/2015 |
| CN | 104311366 | 1/2015 |
| CN | 104326847 | 2/2015 |
| CN | 102936169 | 4/2015 |
| CN | 104557278 | 4/2015 |
| DE | 1146080 | 3/1963 |

(56) References Cited

FOREIGN PATENT DOCUMENTS

| | | |
|---|---|---|
| DE | 1905834 | 11/1972 |
| DE | 142044 | 6/1980 |
| DE | 3042662 | 6/1982 |
| DE | 4128828 | 3/1993 |
| DE | 19631764 | 2/1998 |
| EP | 0047556 | 3/1982 |
| EP | 0255752 | 2/1988 |
| EP | 0491238 | 6/1992 |
| EP | 0877722 | 11/1998 |
| EP | 1043295 | 10/2000 |
| EP | 1067093 | 12/2004 |
| EP | 1724247 | 11/2006 |
| EP | 2431346 | 3/2012 |
| FR | 893153 | 6/1944 |
| FR | 1356105 | 3/1964 |
| GB | 1212605 | 11/1970 |
| GB | 1435678 | 5/1976 |
| GB | 1535807 | 12/1978 |
| JP | 348780 | 7/1991 |
| JP | H07-033576 | 2/1995 |
| JP | H1116798 | 4/1999 |
| JP | H11263689 | 9/1999 |
| JP | H11278973 | 10/1999 |
| JP | 2001294792 | 10/2001 |
| KR | 100974639 | 8/2010 |
| KR | 101485578 | 12/2014 |
| NZ | 596113 | 8/2012 |
| TW | 1549926 | 9/1916 |
| WO | WO 2016/091205 | 6/1916 |
| WO | WO 2016/107548 | 7/1916 |
| WO | WO 2016/186526 | 11/1916 |
| WO | WO 2017/013572 | 1/1917 |
| WO | WO 2017/013573 | 1/1917 |
| WO | WO 2017/081183 | 5/1917 |
| WO | WO 2017/087264 | 5/1917 |
| WO | WO 2017/087265 | 5/1917 |
| WO | WO 2017/100507 | 6/1917 |
| WO | WO 2017/137902 | 8/1917 |
| WO | WO 2017/168288 | 10/1917 |
| WO | WO 2018/162533 | 9/1918 |
| WO | WO 2018/193344 | 10/1918 |
| WO | WO 2018/193345 | 10/1918 |
| WO | WO 2018/193358 | 10/1918 |
| WO | WO 2019/030671 | 2/1919 |
| WO | WO 1989/000079 | 1/1989 |
| WO | WO 1995/026942 | 10/1995 |
| WO | WO 1996/018591 | 6/1996 |
| WO | WO 2003/006399 | 1/2003 |
| WO | WO 2003/045877 | 6/2003 |
| WO | WO 2003/066207 | 8/2003 |
| WO | WO 2004/047974 | 6/2004 |
| WO | WO 2004/098858 | 11/2004 |
| WO | WO 2005/075602 | 8/2005 |
| WO | WO 2006/044393 | 4/2006 |
| WO | WO 2007/022732 | 3/2007 |
| WO | WO 2007/041234 | 4/2007 |
| WO | WO 2007/086773 | 8/2007 |
| WO | WO 2013/017888 | 2/2013 |
| WO | WO 2013/019121 | 2/2013 |
| WO | WO 2013/121384 | 8/2013 |
| WO | WO 2013/128402 | 9/2013 |
| WO | WO 2014/189183 | 11/2014 |
| WO | WO 2015/001457 | 1/2015 |
| WO | WO 2015/114542 | 8/2015 |
| WO | WO 2015/170217 | 11/2015 |
| ZA | 201105819 | 4/2012 |

OTHER PUBLICATIONS

Allison, "The enigma of soil nitrogen balance sheets," *Adv. Agro.* 1995, 7:213-250.

Al-Zahrani, S.M., "Utilization of Polyethylene and Paraffin Waxes as Controlled delivery Systems for Different Fertilizers" *Ind. Eng. Chem. Res.*, 2000, 39(2):367-371.

Bolan et al., "Soil Acidification and Liming Interactions with Nutrient and Heavy Metal Transformation and Bioavailability," *Advances in Agronomy*, 2003, 78:215-272.

Bose, et al., "New protocol for Biginelli reaction—a practical synthesis of Monastrol," *ARKIVOC*, 2005, 3:228-236.

Chien, et al., "Recent Developments of Fertilizer Production and Use to Improve Nutrient Efficiency and Minimize Environmental Impacts," *Advances in Agronomy*, 2009, 102(8):267-322.

Ciurli, et al. "Structural properties of the nickel ions in; urease: novel insights into the catalytic and inhibition mechanisms," *Coord. Chem. Rev.* 1999, 331:190-192.

Gautney, et al., "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.

Gioacchini, et al., "Influence of urease and nitrification inhibitors on N losses from soils fertilized with urea," *Biology and Fertility of Soils*, 2002, 36(2):129-135.

Hays, "Symposium on Controlled Release Fertilizer," *J. Agri. Food*, 1971, 19:797.

International Preliminary Report on Patentability issued in counterpart International Patent Application No. PCT/IB2015/050654, dated Aug. 2, 2016.

International Preliminary Report on Patentability issued in International Patent Application No. PCT/IB2016/054271, dated Oct. 18, 2017.

International Search Report and Written Opinion issued in counterpart International Patent Application No. PCT/IB2015/050654, dated May 19, 2015.

International Search Report and Written Opinion issued in counterpart International Patent Application No. PCT/IB2016/054271, dated Oct. 24, 2016.

International Search Report and Written Opinion issued in counterpart International Application No. PCT/IB2015/053056, dated Sep. 23, 2015.

International Search Report and Written Opinion issued in International Patent Application No. PCT/IB2018/052577, dated Aug. 1, 2018.

International Search Report and Written Opinion issued in International Patent Application No. PCT/IB2018/052578, dated Aug. 1, 2018.

International Search Report and Written Opinion issued in International Patent Application No. PCT/IB2018/052630, dated Aug. 9, 2018.

International Search Report and Written opinion issued in International Application No. PCT/IB2018/055946, dated Dec. 3, 2018.

International Search Report and Written Opinion issued in International Application No. PCT/IB2016/054270, dated Oct. 24, 2016.

International Search Report and Written opinion issued in International Application No. PCT/IB2017/050683, dated Jun. 20, 2017.

International Search Report and Written Opinion issued in International Patent Application No. PCT/US2016/061486, dated Jan. 25, 2017.

International Search Report and Written Opinion issued in International Patent Application No. PCT/US2016/061487, dated Jan. 5, 2017.

Jarosiewicz & Tomaszewska, "Controlled-release NPK fertilizer encapsulated by polymeric membranes." Journal of Agricultural and Food Chemistry, 2003, 51(2):413-417.

Kawakami, et al., "Physiological and yield responses of field-grown cotton to application of urea with the urease inhibitor NBPT and the nitrification inhibitor DCD," *European Journal of Agronomy*, 2012, 43:147-154.

Lunt, et al., "Properties and Value of 1,1-Diureido Isobutane (IBDU) as a Long-Lasting Nitrogen Fertilizer," *J. Agr. Food Chem.*, 1969, 17(6):1269-1271.

Mahmood et al., "Calcium Carbide-Based Formulations cause Slow Release of Acetylene and Ethylene in Soil and Nitrification Inhibition," *Communications in Soil Science and Plant Analysis*, 2014, 45(17): 2277-2288.

(56) References Cited

OTHER PUBLICATIONS

Mahmood et al., "Effect of rate and application depth matrix-I calcium carbide based formulation on growth, yield and nitrogen uptake of wheat," *African Journal of Agricultural Research*, 2011, 6(30): 6363-6398.

Mahmood et al., "Nutritional and physiological response of wheat to soil applied matrix-I formulated calcium carbide with and without nitro gen fertilizer," *Pakistan Journal of Nutrition* 2012, 11(2): 154-159.

Office Action and Search Report issued in Corresponding Taiwanese Patent Application No. 104114189, dated May 9, 2019.

Office Action issued in corresponding Chinese Patent Application No. 201580008733.2, dated Jan. 11, 2019. (Machine Translation Provided).

Office Action issued in corresponding Chinese Patent Application No. 2015800087332, dated Jun. 13, 2019.

Office Action issued in corresponding Chinese Patent Application No. 201680051745.8, dated Jul. 23, 2019.

Office Action issued in corresponding Indian Patent Application No. 201617028561, dated Jun. 18, 2019.

Office Action issued in corresponding Taiwan Patent Application No. 105122936, dated Sep. 5, 2019.

Office Action issued in European Patent Application No. 16741394.7, dated Dec. 7, 2018.

Patra, et al., "Use of urea coated with natural products to inhibit urea hydrolysis and nitrification in soil," *Biol. Fertil. Soils*, 2009, 45:617-621.

Reddy, et al., New environmentally friendly solvent free syntehesis of dihydropyrimidinones catalysed by N-butyl-N, N-dimethyl-phenylethylammonium bromide, *Tetrahedron Letters*, 2003, 44:8173-8175.

Sanz-Cobena, et al., "Gaseous emissions of N2O and NO and NO3—leaching from urea applied with urease and nitrification inhibitors to a maize (*Zea mays*) crop," *Agriculture, Ecosystems & Environment*, 2012, 149:64-73.

Sinclair et al., "Radiation Use Efficiency," *Advances in Agronomy* 1999, 65: 215-265.

Soares, et al., "Ammonia volatilization losses from surface-applied urea with urease and nitrification inhibitors," *Soil Biology and Biochemistry*, 2012, 52:82-89.

Subbarao, et al., "Scope and Strategies for Regulation of Nitrification in Agricultural Systems—Challenges and Opportunities," *Crit. Rev. Plant Sci.*, 2006, 25-303-335.

Trenkel, "Controlled-release and stabilized fertilizers in agriculture." *International fertilizer industry association* 1997, 11:1-156.

Upadhyay,"Urease inhibitors: A review." *Indian Journal of Biotechnology* 2012, 11:381-388.

Watson, et al., "Rate and mode of application of the urease inhibitor N-(n-butyl) thiophosphoric triamide on ammonia volatilization from surface-applied urea," *Soil Use and Management*, 2008, 24:246-253.

Wu, et al., "Guidelines for the Use of Fertilizers," *Chinese Agricultural Press*, 2000, 122-123. (English Translation).

Zaman, et al., "Effects of urease and nitrification inhibitors on the efficient use of urea for pastoral systems," *J. Soil Science and Plant Nutrition*, 2013, 59(4):649-659.

Zaman, et al., "Improving pasture growth and urea efficiency using N inhibitor, molybdenum and elemental Sulphur," *Journal of Soil Science and Plant Nutrition*, 2014, 14(1):245-257.

Azeem, et al. "Review on materials & methods to produce controlled release coated urea fertilizer," *Journal of Controlled Release*, 2014, 181:11-21.

Babu, et al. "Current Progress on bio-based polymers and their future trends," *Progress in Biomaterials*, 2013, 2:8.

Extended European Search Report issued in counterpart European Patent Application No. 20166713.6, dated Nov. 11, 2020.

Extended European Search Report issued in European Application No. 1686688.7, dated Jun. 13, 2019.

International Search Report and Written Opinion issued in International Patent Application No. PCT/IB2017/050683, dated Jun. 20, 2017.

Lubkowski, "Coating Fertilizer Granules with Biodegradable Materials for Controlled Fertilizer Release," Environmental Engineering and Management Journal, 2014, 13:2573-2581.

Office Action issued in corresponding Chinese Patent Application No. 201680051728.4, dated Aug. 11, 2020.

Office Action issued in counterpart Chinese Patent Application No. 201680051745.8, dated Dec. 2, 2020.

Search Report issued in corresponding Chinese Patent Application No. 201680051745.8, dated Jul. 2, 2019.

Search Report issued in corresponding Chinese Patent Application No. 201680051728.4, dated Aug. 5, 2020.

Yixing, et al. "Application Technology of Novel Slow and Controlled Release Fertilizer," *China Three Gorges Press*, 2008, 1, pp. 90 and 92.

Yongkang, et al. "Modern Drying Technology," *Chemical Industry Press*, 2007, 1:719-722.

* cited by examiner

EXTRUDED FERTILIZER GRANULES WITH UREASE AND/OR NITRIFICATION INHIBITORS

CROSS REFERENCE TO RELATED APPLICATIONS

This application is a national phase application under 35 U.S.C. § 371 of International Application No. PCT/IB2018/055946, filed Aug. 7, 2018, which claims the benefit and priority of U.S. Provisional Patent Application No. 62/543,121 filed Aug. 9, 2017, the contents of which applications are hereby incorporated by reference in their entirety.

BACKGROUND OF THE INVENTION

A. Field of the Invention

The invention generally concerns a fertilizer that includes urease inhibitors and/or nitrification inhibitors. The fertilizer can be an extruded fertilizer granule that contains solid urea, a polymeric binder, and a nitrification inhibitor and/or an urease inhibitor.

B. Description of Related Art

To increase crop yield and satisfy the growing needs of an increasing population, more fertilizers are being used in agriculture. Fertilizers containing nitrogen are used to support healthy plant growth and photosynthesis. Urea ($CH_4N_2O$) is a compound that contains nitrogen and is widely used as a nitrogen source in fertilizers. However, due to its rapid hydrolysis and nitrification in the soil by soil bacteria, nitrogen from urea can be quickly lost.

Hydrolysis and nitrification of urea in soil can be counteracted by adding urease inhibitors and nitrification inhibitors, respectively, to the fertilizer. Urease inhibitors reduce the amount of urea hydrolyzed, which reduces the amount of nitrogen lost through ammonia volatilization. Nitrification inhibitors reduce the rate of conversion of ammonium into nitrate, which also reduces the amount of nitrogen lost. Urease inhibitors and/or nitrification inhibitors have been formulate into powders, coatings, and liquids for uses in or along with nitrogen fertilizers. See U.S. Pub. Nos.: 2015/0031786 and 2015/0197460; U.S. Pat. Nos. 9,422,203 and 9,446,993; EP 0047556; and ZA 201105819.

While use of urease inhibitors and nitrification inhibitors in fertilizers has been employed as a solution to the problems of urea hydrolysis and nitrification, there are certain difficulties in using these inhibitors. One problem is that some inhibitors are heat sensitive, which complicates the manufacturing process for fertilizers that include such inhibitors. For example, adding a heat-sensitive inhibitor to molten urea before granulation can cause substantial degradation of the inhibitor, as described in *Soil Use & Management*, 24:246 (2008). This problem is amplified when unacceptable granules, such as granules that do not meet the size requirements, are recycled to form new granules. During recycling some inhibitors can be lost in the form of dust particles, and heat-sensitive inhibitors can be degraded when heated again during the re-granulation process. To compensate for this problem, some fertilizer manufacturers may add an excess of inhibitor to the urea melt, which increases the cost of producing the fertilizer.

SUMMARY OF THE INVENTION

The inventors have discovered a solution to at least some of the aforementioned problems associated with fertilizers. The solution resides in providing an extruded fertilizer granule containing urea, a polymeric binder, and a urease inhibitor and/or a nitrification inhibitor. The polymeric binder can have a melting point that is lower than the melting temperature of urea and lower than a temperature in which the urease inhibitor and/or a nitrification inhibitor degrades. Therefore, the fertilizer can be extruded using temperatures that do not degrade a urease inhibitor and/or a nitrification inhibitor. In addition, the presence of the polymeric binder in the extruded fertilizer granule can improve the stability of the urease inhibitor and/or a nitrification inhibitor. Additional ingredients used in fertilizers, including temperature sensitive active ingredients, can also be included in the extruded fertilizer granule. An additional advantage is that the extrusion process can produce granules of a consistent size, reducing or eliminating the need to recycle granules that do not meet the size requirements. In some instances, a plurality of the extruded fertilizer granules can also be combined with other fertilizers or fertilizer ingredients to form a blended fertilizer. The blending can occur after the extruded fertilizer granules are formed. In this way, the extruded fertilizer granules can be added to other fertilizers to produce a custom fertilizer blend and/or a product to fit fertilizer needs for particular applications.

In one aspect of the present invention, there is disclosed an extruded fertilizer granule containing an extrudate that contains solid urea, one or more nitrification and/or urease inhibitor(s), and a polymeric binder having a melting point of less than 80° C., preferably 35° C. to 70° C. The extrudate can be bound together by the polymeric binder. By way of example, an extruded fertilizer granule can include one or a plurality of solid urea particles that can be bound together along with the nitrification and/or urease inhibitor(s) via the polymeric binder. In some instances, the extrudate can further contain micronutrients and/or other fertilizer ingredients. In some instances, the extrudate does not contain any further ingredients.

In some aspects, the urease inhibitor can be N-(n-butyl) thiophosphoric triamide (NBTPT) and the nitrification inhibitor can be dicyandiamide (DCD). The polymeric binder can be biodegradable and/or water soluble. The polymeric binder can be polyethylene glycol and/or polycaprolactone. The solid urea can be powdered urea that includes a plurality of urea particles.

The components of the extruded fertilizer granule can be contained therein at any concentration as compared to the weight of the extruded fertilizer granule. In some instances, the solid urea is 40 wt. % to 90 wt. %, preferably 50 wt. % to 80 wt. %. In some instances, the polymeric binder is 10 wt. % to 40 wt. %, preferably 20 wt. % to 30 wt. %. In some instances, the one or more nitrification and/or urease inhibitor(s) is/are 0.02 wt. % to 10 wt. %, preferably between 0.1 wt. % to 3 wt. %. The urease inhibitor can be 0.02 wt. % to 0.5 wt. %, preferably 0.07 wt. % to 0.12 wt. %. The nitrification inhibitor can be 0.5 wt. % to 10 wt. %, preferably 1 wt. % to 3 wt. %.

The extrudate can also be any size and any shape. In certain aspects, the shape can be spherical, a puck, an oval, a rod, an oblong, or a random shape. In certain instances, the shape is spherical and can have a diameter of 1 mm to 4 mm, preferably 2 to 3.5 mm. For blends that include a plurality of extrudates, one non-limiting embodiment is a spherical shape having an average diameter of 1 mm to 4 mm, preferably 2 to 3.5 mm.

In some aspects of the present invention, there is disclosed a fertilizer composition. The fertilizer composition can contain a mixture of urea granules and a plurality of the extruded fertilizer granules disclosed herein. The fertilizer composition can contain any concentration of the urea granules and the extruded fertilizer granules. In some instances, the fertilizer composition contains 0.02 wt. % to 2.5 wt. %, preferably between 0.05 wt. % to 2 wt. %, of the one or more nitrification and/or urease inhibitor(s), based on the total weight of the fertilizer composition. The extruded fertilizer granules can be the source of the entire amount of the nitrification and/or urease inhibitor(s) in the fertilizer composition.

Also disclosed in the context of the present invention are processes and methods for making and/or using an extruded fertilizer granule and fertilizer compositions disclosed herein. A fertilizer can be produced by extruding a composition containing solid urea, a polymeric binder having a melting point of less than 80° C., preferably 35° C. to 70° C., and one or more nitrification and/or urease inhibitor(s) at an extrusion temperature sufficient to melt the polymeric binder and form an extrudate that is bound together by the polymeric binder. The process can further include forming fertilizer granules from the extrudate. In some instances, the extrudate is any of the extrudates disclosed herein.

The process can further include combining the extruded fertilizer granules with urea granules to form a blended fertilizer. In some instances, the urea granules are not bound in or by the extrudate of the extruded fertilizer granules. The extruded fertilizer granules and urea granules can be combined at any ratio. In some instances, no urea granules are combined with the extruded fertilizer granules. In some instances, the blended fertilizer contains extruded fertilizer granules and urea granules at a ratio of 1:10 to 100:1, preferably 1:6 to 10:1, more preferably 1:4 to 1:1.

The extrusion temperature can be higher than the melting point of the polymeric binder. The temperature can be lower than a temperature in which the urease inhibitor and/or a nitrification inhibitor degrades. The temperature can be lower than the melting temperature of urea. In some instances, the extrusion temperature can be less than 130° C., less than 100° C., less than 95° C., less than 90° C., less than 80° C., preferably 35° C. to 70° C., more preferably 40° C. to 60° C.

The extrusion process can be carried out in any extruder. In some instances, the extruder is a co-rotating twin screw extruder, preferably a co-rotating twin screw extruder having six barrels capable of rotating at an RPM of 100 to 300, preferably about 200.

The extruded fertilizer granules herein, the fertilizer compositions herein, and the fertilizer compositions produced by the processes herein can be used to fertilize by applying to at least one of a soil, water, a carrier for an organism, and/or an organism. In some instances, the extruded fertilizer granules herein, the fertilizer compositions herein, and the fertilizer compositions produced by the processes herein are combined with a liquid carrier, a liquid solvent, or a combination thereof before being applied to the soil, water, the carrier for an organism, and or the organism.

Also disclosed are the following Embodiments 1 to 20 of the present invention. Embodiment 1 is an extruded fertilizer granule comprising an extrudate having: solid urea; one or more nitrification or urease inhibitor(s) or a combination thereof; and a polymeric binder having a melting point of less than 80° C., preferably 35° C. to 70° C., wherein the extrudate is bound together by the polymeric binder. Embodiment 2 is the extruded fertilizer granule of Embodiment 1, wherein the extrudate comprises by weight of the extrudate: 40 wt. % to 90 wt. %, preferably 50 wt. % to 80 wt. %, of the solid urea; 10 wt. % to 40 wt. %, preferably 20 wt. % to 30 wt. %, of the binder; and 0.02 wt. % to 10 wt. %, preferably between 0.1 wt. % to 3 wt. %, of one or more nitrification and/or urease inhibitor(s). Embodiment 3 is the extruded fertilizer granule of any of Embodiments 1 to 2, wherein the extrudate comprises: 0.02 wt. % to 0.5 wt. %, preferably 0.07 wt. % to 0.12 wt. %, of the urease inhibitor; and/or 0.5 wt. % to 10 wt. %, preferably 1 wt. % to 3 wt. %, of the nitrification inhibitor. Embodiment 4 is the extruded fertilizer granule of any of Embodiments 1 to 3, wherein the extrudate comprises a urease inhibitor comprising N-(n-butyl) thiophosphoric triamide and/or wherein the extrudate comprises a nitrification inhibitor comprising dicyandiamide. Embodiment 5 is the extruded fertilizer granule of any of Embodiments 1 to 4, wherein the polymeric binder is biodegradable and/or water soluble, preferably wherein the polymeric binder is polyethylene glycol and/or polycaprolactone. Embodiment 6 is the extruded fertilizer granule of any of Embodiments 1 to 5, wherein the solid urea is powdered urea. Embodiment 7 is the extruded fertilizer granule of any of Embodiments 1 to 6, further comprising micronutrients. Embodiment 8 is the extruded fertilizer granule of any of Embodiments 1 to 7, wherein the extrudate has a diameter of 1 mm to 4 mm, preferably 2 to 3.5 mm. Embodiment 9 is a fertilizer composition comprising a mixture of: (a) urea granules; and (b) a plurality of the extruded fertilizer granules of any of Embodiments 1 to 8. Embodiment 10 is the fertilizer composition of Embodiment 9, wherein the fertilizer composition contains 0.02 wt. % to 2.5 wt. %, preferably between 0.05 wt. % to 2 wt. %, of the one or more nitrification and/or urease inhibitor(s). Embodiment 11 is a process for producing a fertilizer, the process comprising: extruding a composition comprising solid urea, a polymeric binder having a melting point of less than 80° C., preferably 35° C. to 70° C., and one or more nitrification or urease inhibitor(s) or a combination thereof at an extrusion temperature sufficient to melt the polymeric binder and form an extrudate that is bound together by the polymeric binder; and forming fertilizer granules from the extrudate. Embodiment 12 is the process for producing a fertilizer of Embodiment 11, wherein the extrudate comprises: 40 wt. % to 90 wt. %, preferably 50 wt. % to 80 wt. %, of the solid urea; 10 wt. % to 40 wt. %, preferably 20 wt. % to 30 wt. %, of the polymeric binder; and 0.02 wt. % to 10 wt. %, preferably between 0.1 wt. % to 3 wt. %, of one or more nitrification and/or urease inhibitor(s). Embodiment 13 is the process for producing a fertilizer of any of Embodiments 11 to 12, wherein the extrudate comprises: 0.02 wt. % to 0.5 wt. %, preferably 0.07 wt. % to 0.12 wt. %, of the urease inhibitor; and/or 0.5 wt. % to 10 wt. %, preferably 1 wt. % to 3 wt. %, of the nitrification inhibitor. Embodiment 14 is the process for producing a fertilizer of any of Embodiments 11 to 13, wherein the urease inhibitor comprises N-(n-butyl) thiophosphoric triamide and/or wherein the nitrification inhibitor comprises dicyandiamide. Embodiment 15 is the process for producing a fertilizer of any of Embodiments 11 to 14, wherein the polymeric binder is biodegradable and/or water soluble, preferably wherein the polymeric binder is polyethylene glycol and/or polycaprolactone. Embodiment 16 is the process for producing a fertilizer of any of Embodiments 11 to 15, wherein the solid urea is powdered urea. Embodiment 17 is the process for producing a fertilizer of any of Embodiments 11 to 16, wherein the fertilizer granules have an average diameter of 1 mm to 4 mm, preferably 2 to 3.5 mm. Embodiment 18 is the process for producing a fertilizer of any of Embodiments 11 to 17, wherein: the extrusion temperature is less than 80° C., preferably 35° C. to 70° C., more preferably 40° C. to 60°

C.; the extrudate is extruded from a co-rotating twin screw extruder, preferably from a co-rotating twin screw extruder having six barrels rotating at a RPM of 200. Embodiment 19 is the process for producing a fertilizer of any of Embodiments 11 to 18, further comprising combining the fertilizer granules with urea granules to form a blended fertilizer such that the added urea granules are not bound in the extrudate of the fertilizer granules. Embodiment 20 is the process for producing a fertilizer of Embodiment 19, wherein the blended fertilizer comprises the fertilizer granules and urea granules at a ratio of 1:10 to 100:1, preferably 1:6 to 10:1, more preferably 1:4 to 1:1.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary nitrogen phosphorous (NP) fertilizers, binary nitrogen potassium (NK) fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants, urease inhibitors, and nitrification inhibitors. In some particular instances, the fertilizer is urea.

The term "granule" can include a solid material. A granule can have a variety of different shapes, non-limiting examples of which include a spherical, a puck, an oval, a rod, an oblong, or a random shape. The terms "granule" and "particle" are interchangeable in this application.

The terms "particulate" or "powder" can include a plurality of particles.

"Solid urea" can refer to a urea particle or a plurality of urea particles in particulate or powdered form.

The term "biodegradable" is defined as capable of being degraded by naturally occurring living organisms or through natural environmental conditions such as exposure to water, rain, sunlight, heat, cold, etc. Naturally occurring living organisms can include bacteria, fungus, plants, insects, animals, mammals, and/or humans.

The term "reducing" or any variation of this term, includes any measurable decrease or complete reduction to achieve a desired result.

The term "effective," or any variation of this term, means adequate to accomplish a desired, expected, or intended result.

The terms "about," "approximately," and "substantially" are defined as being close to, as understood by one of ordinary skill in the art. In one non-limiting instance, the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component. In a non-limiting example, 10 grams of a component in 100 grams of the material that includes the component is 10 wt. % of component.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The process and compositions of the present invention can "comprise," "consist essentially of," or "consist of" particular ingredients, components, compositions, etc., disclosed throughout the specification. With respect to the transitional phase "consisting essentially of," in one non-limiting aspect, a basic and novel characteristic of the extruded fertilizer granule compositions of the present invention is the presence of a combination of solid urea, one or more nitrification or urease inhibitor(s), and a polymeric binder with a melting point below the degradation temperature of the nitrification or urease inhibitor(s), and wherein the extrudate is bound together by the polymeric binder.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes, combinations, and modifications within the spirit and scope of the invention will become apparent to those skilled in the art from this detailed description.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

While the invention is susceptible to various modifications and alternative forms, specific embodiments thereof are shown by way of example in the drawings and may herein be described in detail. The drawings may not be to scale.

DETAILED DESCRIPTION OF THE INVENTION

The extruded fertilizer granule of the present invention can include solid urea, a polymeric binder, and a urease inhibitor and/or a nitrification inhibitor. However, additional ingredients are contemplated. The extruded fertilizer granules can be extruded using temperatures that do not degrade a urease inhibitor and/or a nitrification inhibitor but are sufficient to melt or soften the polymeric binder. The presence of the polymeric binder in the extruded fertilizer granule can stabilize the urease inhibitors and nitrification inhibitors. The extruded fertilizer granules can have a consistent size. The blended fertilizers herein can contain a plurality of the extruded fertilizer granules in combination with other fertilizers or fertilizer ingredients. These and other non-limiting aspects of the present invention are discussed in further detail in the following sections.

A. Extruded Fertilizer Granule

Figure 1:
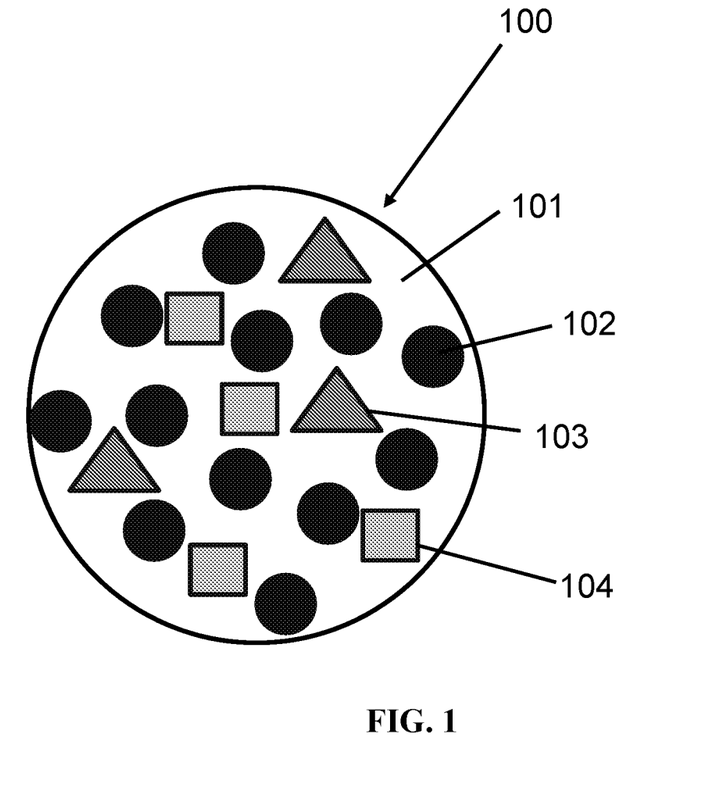
FIG. 1 illustrates a non-limiting symbolized representation of a cross section of an extruded fertilizer granule embodiment.

An illustrative cross section view of a non-limiting embodiment of an extruded fertilizer granule of the present invention is depicted symbolically in FIG. 1. In the illustrated embodiment, the extruded fertilizer granule 100 contains a polymeric binder 101, solid urea 102, and one or more of nitrification inhibitor 103 and urease inhibitor 104. The extruded fertilizer granule 100 has a circular cross-section in the illustration, although other shapes are contemplated and can readily be made (e.g, elliptical, cubic, tetrahedron, cylindrical, conical, random shapes, etc.). The extruded fertilizer granule 100 may also contain other ingredients, such as micronutrients, fillers, pH balancing agents, and/or thickeners, etc. In the illustration, and for illustrational purposes only, solid urea 102 has a circular cross section, nitrification inhibitor 103 has a triangle cross section, and urease inhibitor 104 has a square cross section. The shapes, sizes, and relative numbers of the components in the illustration are used to assist in easily distinguishing the different components in the extruded fertilizer granule 100 and are non-limiting. Other shapes, sizes, and relative numbers of components are contemplated and can readily be made. In the illustration, nitrification inhibitor 103 and urease inhibitor 104 are both shown to be contained in extruded fertilizer granule 100, although extruded fertilizer granules containing no nitrification inhibitor 103 or no urease inhibitor 104 are contemplated and can be readily made. In the illustrated embodiment, some of the nitrification inhibitors 103 and urease inhibitors 104 are kept separate within the extruded fertilizer granule 100 by being disposed in polymeric binder 101, although in some embodiments, some of the nitrification inhibitors 103 and urease inhibitors 104 can be in contact with each other. In certain aspects of the present invention, the polymeric binder can act as a continuous phase that helps bind the solid urea, the nitrification inhibitor, and/or the urease inhibitor together to form the extruded granule. The solid urea, the nitrification inhibitor, and/or the urease inhibitor can act as dispersed phases. It will be apparent to persons of ordinary skill in the art that other configurations of the extruded fertilizer granule 100 are possible.

The extruded fertilizer granule 100 can have a spherical, puck, oval, oblong, etc. cross section shape, or other shapes noted throughout the specification and known to those of ordinary skill in the art. The extruded fertilizer granule 100 can also have a variety of sizes. In some embodiments, the fertilizer granule can be substantially spherical in shape and can have a diameter between about 1 and 8 mm, 1 and 4 mm, or 2 and 3.5 mm, or any size therein.

B. Polymeric Binder

Polymeric binders can be a polymer that is used to bind together components in a mixture through adhesive and/or cohesive forces. The polymeric binder to be used in the extruded fertilizer granule can be chosen for suitability in the extrusion processes for making the extruded fertilizer granule. The polymeric binder can have a melting point or softening temperature below the temperature that a urease inhibitor and/or a nitrification inhibitor contained in the extruded fertilizer granule degrades. In non-limiting examples, this temperature is below 132° C., below 130° C., below 125° C., below 120° C., below 115° C., below 110° C., below 105° C., below 100° C., below 95° C., below 90° C., below 85° C., below 80° C., below 75° C., below 70° C., below 65° C., below 60° C., below 65° C., below 60° C., below 55° C., below 50° C., below 45° C., below 40° C., below 35° C., below 30° C., below 25° C., below 20° C., or any temperature therein. Preferably, the melting point is less than 100° C., less than 95° C., less than 90° C., less than 80° C., and more preferably at or between 35° C. to 70° C., or any temperature therein. In some instances, the polymeric binders are biodegradable. In some instances the polymeric binders are water soluble.

Non-limiting examples of polymeric binders include polyethylene glycol, polycaprolactone, polyacrylamide, polyacrylic acid, polyacrylonitrile, biodegradable polylactic acid, and other biodegradable polymeric material such as polylactic acid, poly(3-hydroxypropionic acid), polyvinyl alcohol, poly e-caprolactone, poly L-lactide, polybutylene succinate, and biodegradable starch based polymers.

The extruded fertilizer granule can contain any amount of polymeric binder. The extruded fertilizer granule can have a sufficient amount of a polymeric binder to bind together the extrudate. The concentration of the polymeric binder can be 60 wt. %, 50 wt. %, 40 wt. %, 30 wt. %, 20 wt. %, 10 wt. %, 5 wt. %, or any concentration therein based on the total weight of the extruded fertilizer granule. In preferred embodiments, the extruded fertilizer granule contains 10 wt. % to 40 wt. %, more preferably 20 wt. % to 30 wt. %, or any range therein, of the polymeric binder.

Extruded fertilizer granules of the present invention can have desirable physical properties such as desired levels of abrasion resistance, strength, pelletizability, hygroscopicity, shape, and/or size distribution. Accordingly, the binder may be chosen to optimize these properties.

C. Urease Inhibitors and Nitrification Inhibitors

Urea is a known fertilizer that can be used in the context of the present invention. A number of urease and nitrification inhibitors have been developed to enhance the efficiency of urea fertilizer, but their application can be challenging due to stability problems in processing and in the soil under various conditions such as pH, temperature, precipitation, etc. For example, NBTPT is known to be a good inhibitor of urease but it is unstable under acidic pH and high temperatures, such as the temperature of a typical urea melt (about 135-140° C.).

To overcome these issues, embodiments of the extruded fertilizer granules of the present invention are provided that contain polymeric binder that can melt or become sufficiently soft for extrusion at temperatures that the urease and/or nitrification inhibitors do not degrade. The extruded fertilizer granule may also contain a pH buffering agent. The pH buffering agent can be a material that can neutralize the acidity caused by urea hydrolysis, thereby preventing active agents, such as, for example, NBTPT, from degrading when placed in soil with an acidic pH. Thus, the pH buffering agent can increase the efficacy of active agents, such as, for example, NBTPT, and also maintain soil pH. The extruded fertilizer granules can also have the advantage of stabilizing the urease inhibitor and a nitrification inhibitor.

Urease inhibitors that may be included in the extruded fertilizer granule described herein include, without limitation, NBTPT, N-(n-propyl)thiophosphoric triamide (NPTPT), and phenyl phosphorodiamidate (PPDA), or combinations thereof.

Nitrification inhibitors that may be included in the extruded fertilizer granule described herein include, without limitation, DCD, 3,4-dimethylpyrazole phosphate (DMPP), thio-urea (TU), 2-chloro-6-(trichloromethyl)-pyridine (Nitrapyrin), 5-ethoxy-3-trichloromethyl-1,2,4-thiadiazol (Terrazole), 2-amino-4-chloro-6-methyl-pyrimidine (AM), 2-mercapto-benzothiazole (MBT), or 2-sulfanilamid-thiazole (ST), or combinations thereof.

The extruded fertilizer granule can contain any amount of urease inhibitors and/or nitrification inhibitors. The extruded fertilizer granule can have an effective amount of a urease inhibitor and/or nitrification inhibitor. The concentration of the urease inhibitor and/or nitrification inhibitor can be 30 wt. %, 25 wt. %, 20 wt. %, 15 wt. %, 10 wt. %, 9 wt. %, 8 wt. %, 7 wt. %, 6 wt. %, 5 wt. %, 4 wt. %, 3 wt. %, 2 wt. %, 1 wt. %, 0.9 wt. %, 0.8 wt. %, 0.7 wt. %, 0.6 wt. %, 0.5 wt. %, 0.4 wt. %, 0.3 wt. %, 0.2 wt. %, 0.1 wt. %, 0.09 wt. %, 0.08 wt. %, 0.07 wt. %, 0.06 wt. %, 0.05 wt. %, 0.04 wt. %, 0.03 wt. %, 0.02 wt. %, 0.01 wt. % or any concentration therein based on the weight of the extruded fertilizer granule. In preferred embodiments, the extruded fertilizer granule contains 0.02 wt. % to 10 wt. %, more preferably 0.1 wt. % to 10 wt. %, 0.5 wt. % to 10 wt. %, 0.1 wt. % to 3 wt. %, or about 1 wt. % to 3 wt. %, or any range therein.

D. Additional Fertilizers

Additional fertilizer substances besides urea may be included in the extruded fertilizer granule of the present invention. Additional fertilizers can be chosen based on the particular needs of certain types of soil, climate, or other growing conditions to maximize the efficacy of the extruded fertilizer granule in enhancing plant growth and crop yield. Additional additives may also be included in the extruded fertilizer granule, including without limitation micronutrients, primary nutrients, and secondary nutrients. A micronutrient can be a botanically acceptable form of an inorganic or organometallic compound such as boron, copper, iron, chloride, manganese, molybdenum, nickel, or zinc. A primary nutrient can be a material that can deliver nitrogen, phosphorous, and/or potassium to a plant. Nitrogen-containing primary nutrients may include urea, ammonium nitrate, ammonium sulfate, diammonium phosphate, monoammonium phosphate, urea-formaldehyde, or combinations thereof. A secondary nutrient can be a substance that can deliver calcium, magnesium, and/or sulfur to a plant. Secondary nutrients may include lime, gypsum, superphosphate, or a combination thereof.

E. pH Buffering Agents

The extruded fertilizer granule of the present invention may also contain one or more pH buffering agents to help counteract the tendency of urea fertilizer to acidify the soil. Examples of suitable pH buffering agents include, but are not limited to, $CaCO_3$, $MgO$, $KH_2PO_4$, $NaHCO_3$, chalk powder, aluminum, magnesium hydroxide, aluminum hydroxide/magnesium hydroxide co-precipitate, aluminum hydroxide/sodium bicarbonate co-precipitate, calcium acetate, calcium bicarbonate, calcium borate, calcium carbonate, calcium bicarbonate, calcium citrate, calcium gluconate, calcium hydroxide, dibasic sodium phosphate, dipotassium hydrogen phosphate, dipotassium phosphate, disodium hydrogen phosphate, magnesium acetate, magnesium borate, magnesium bicarbonate, magnesium carbonate, magnesium hydroxide, magnesium lactate, magnesium oxide, magnesium phosphate, magnesium silicate, magnesium succinate, magnesium tartrate, potassium acetate, potassium carbonate, potassium bicarbonate, potassium borate, potassium citrate, potassium metaphosphate, potassium phthalate, potassium phosphate, potassium polyphosphate, potassium pyrophosphate, potassium succinate, potassium tartrate, sodium acetate, sodium bicarbonate, sodium borate, sodium carbonate, sodium citrate, sodium gluconate, sodium hydrogen phosphate, sodium hydroxide, sodium lactate, sodium phthalate, sodium phosphate, sodium polyphosphate, sodium pyrophosphate, sodium tartrate, sodium tripolyphosphate, synthetic hydrotalcite, tetrapotassium pyrophosphate, tetrasodium pyrophosphate, tripotassium phosphate, trisodium phosphate, and trometamol, and combinations thereof.

F. Fillers

The extruded fertilizer granule of the present invention can contain a filler, which is a material that can improve the physical properties of the extruded fertilizer granule, such as crush strength, homogeneity, and extrusion properties, or alter the release kinetics of inhibitors or micronutrients from the extruded fertilizer granule. A filler in combination with a binder can be selected to enhance physical and release properties of the extruded fertilizer granule. The filler can contain, for example, silica, dried distillers grains with solubles (DDGS), rice husk or other biomaterial, or a combination thereof.

G. Blended Fertilizer

The extruded fertilizer granule of the present invention can also be included in a blended composition containing other fertilizers, such as fertilizer granules. Additional fertilizers can be chosen based on the particular needs of certain types of soil, climate, or other growing conditions to maximize the efficacy of the extruded fertilizer granule in enhancing plant growth and crop yield. The other fertilizer granules can be granules of urea, ammonium sulfate, and the like. In some instances, the other fertilizer can be urea granules.

The extruded fertilizer granules can be blended with other fertilizer at any concentration. In some instances, the desired concentration is sufficient to meet the required inhibitor content in the blend. In some instances the blend contains one or more nitrification and/or urease inhibitor(s), based on the weight of the blend, at more than 10 wt. %, at 10 wt. %, 9 wt. %, 8 wt. %, 7 wt. %, 6 wt. %, 5 wt. %, 4 wt. %, 3 wt. %, 2 wt. %, 1 wt. %, 0.9 wt. %, 0.8 wt. %, 0.7 wt. %, 0.6 wt. %, 0.5 wt. %, 0.4 wt. %, 0.3 wt. %, 0.2 wt. %, 0.1 wt. %, 0.09 wt. %, 0.08 wt. %, 0.07 wt. %, 0.06 wt. %, 0.05 wt. %, 0.04 wt. %, 0.03 wt. %, 0.02 wt. %, 0.01 wt. % or any concentration there between. In a preferred embodiment, the blend contains 0.02 wt. % to 2.5 wt. %, more preferably between 0.05 wt. % to 2 wt. %, of the one or more nitrification and/or urease inhibitor(s), or any concentration therein. The blended fertilizer can contain a ratio of the extruded fertilizer granules disclosed herein to urea granules at 1:100, 1:90, 1:80, 1:70, 1:60, 1:50, 1:40, 1:20, 1:10, 1:5, 1:4, 1:3, 1:2, 1:1, 2:1, 3:1, 4:1, 5:1, 10:1, 20:1, 30:1, 40:1, 50:1, 60:1, 70:1, 80:1, 90:1, 100:1, 1,000:1, 10,000:1, or any ratio therein. In a preferred embodiment, the blend contains ratios of 1:6 to 100:1, more preferably 1:4 to 1:1, or any range therein, of extruded fertilizer granules of the present invention to urea granules.

H. Method of Making an Extruded Fertilizer Granule and a Blended Fertilizer

In some embodiments, the extruded fertilizer granule is made by extruding a composition containing solid urea, a polymeric binder, one or more of a urease inhibitor and/or a nitrification inhibitor, and, optionally, other suitable substances such as fillers, pH balancing agents, micronutrients, or other additives. The extrudate can be formed by mixing the ingredients in dry form, adding any solvent, if needed, and further mixing to make an extrudable composition. A solvent, such as water, may be needed to make an extrudable composition. The extrusion can be done using a suitable extruder apparatus known in the art and can be performed at a temperature between 0° C. and 133° C. and a screw speed from 1 to 500 rpm, wherein the extruder contains a multifeeder containing extrusion components including a main drive, shaft, screw, barrel, and/or die. The binder can contain a polymeric binder and the extrusion can be performed at a temperature below 133° C., preferably below 80° C., and more preferably between about 35° C. and 70° C. In some instances, the extrusion is performed at 133° C., 130° C., 125° C., 120° C., 115° C., 110° C., 105° C., 100° C., 95° C., 90° C., 85° C., 80° C., 75° C., 70° C., 65° C., 60° C., 55° C., 50° C., 45° C., 40° C., 35° C., 30° C., 25° C., or 20° C., or any temperature there between.

In some embodiments, the extrusion method includes slicing the extrudate, forming an extruded fertilizer granule having a cylindrical shape and having a diameter between about 1 and 4 mm. The method can also include a drying step to remove solvent that may have been added to make the composition extrudable. The cylindrical extruded fertilizer granule can be spheronized, producing a extruded fertilizer granule having a substantially spherical shape.

Figure 2:
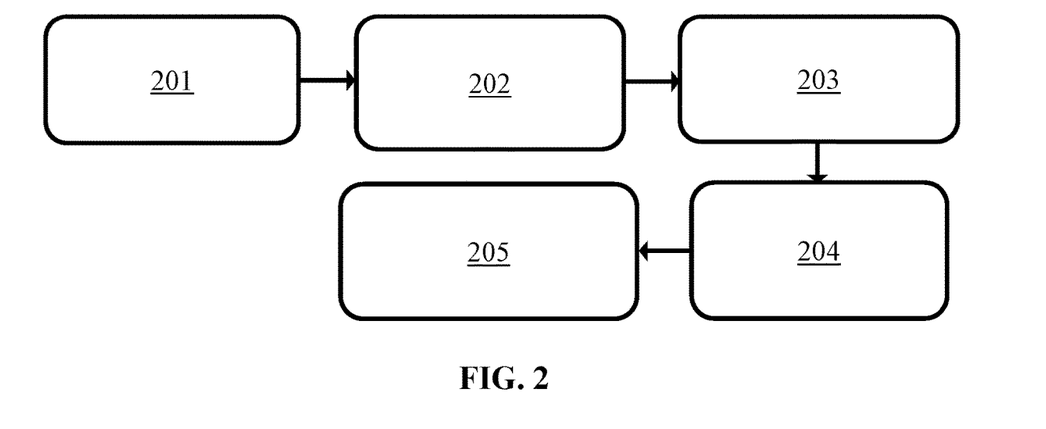
FIG. 2 depicts an embodiment of a process by which an extruded fertilizer granule is produced.

FIG. 2 illustrates an embodiment of a process by which an extruded fertilizer granule can be produced. To make the extruded fertilizer granule, the extruded fertilizer granule ingredients, which can include solid urea, a polymeric binder, and one or more urease inhibitors and/or nitrification inhibitors, among optionally other suitable ingredients, can be placed into the feeders of an extruder 201. The extruder 202 can be configured to push the mixed extruded fertilizer granule ingredients through a die 203 in the process of extrusion and a cutting implement associated with the die cuts the extrudate into pieces, resulting in pellets, which may be further processed (not shown) to be dried, if needed.

After final processing, at least a majority of the extruded fertilizer granules can be within a desired size and/or shape. However, some extruded fertilizer granules may either be over-sized or under-sized. These off-specification extruded fertilizer granules can be separated, crushed, and the crushed material can be re-directed through the process again. The recycled, crushed material can be pelletized. In some embodiments, the pelletized recycled material is blended with the extruded fertilizer granules. These compositions can contain between 0 wt. % and 50 wt. % of the granules containing the recycled composition. However, an advantage of the claimed processes herein is that the amount of off-specification extruded fertilizer granules can be reduced and may be completely eliminated due, in part, to the materials used and/or processing conditions used.

The pelletized fertilizer granules can, in some instances, be conveyed 204 to a storage facility 205, for use, or for further processing.

Figure 3:
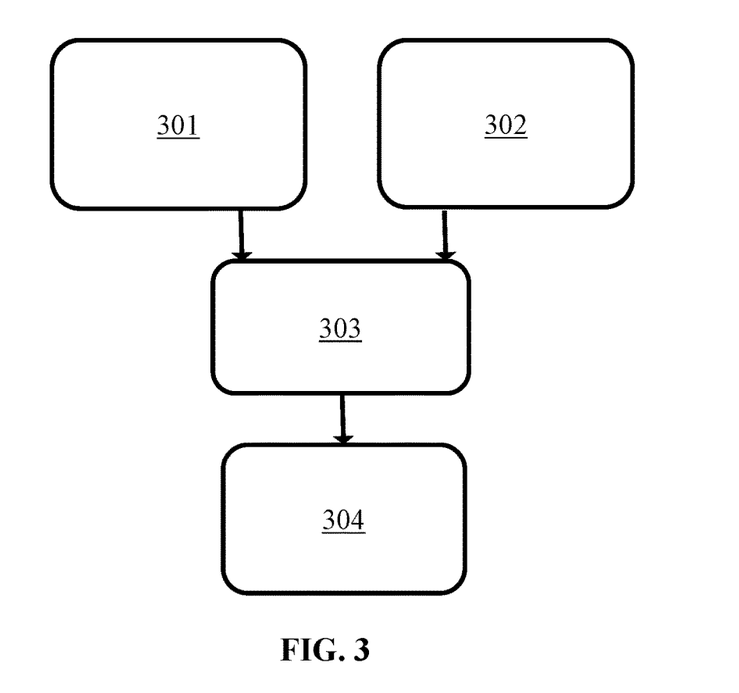
FIG. 3 depicts an embodiment of a process by which a blended fertilizer is produced.

In some instances, a blended fertilizer is produced. FIG. 3 illustrates an embodiment of a process by which a blended fertilizer can be produced. To make the blended fertilizer, the extruded fertilizer granule and another fertilizer, micronutrient, plant protection agent, filler, and/or other fertilizer ingredients can be mixed. In some embodiments, the extruded fertilizer granule 301 is mixed with granulated urea 302. The mixing can be performed by known processes such as blending, pouring mixing, vortexing, shaking, etc. In one instance, a fertilizer blending unit 303 can be used. The fertilizer blending unit can be commercially available. In some instances, a ribbon blender can be used. The blended fertilizer can, in some instances, be conveyed to a storage facility 304, for use, or for further processing.

I. Methods of Using Fertilizer Extruded Fertilizer Granules

The extruded fertilizer granules of the present invention can be used in methods of increasing the amount of nitrogen in soil and of enhancing plant growth. Such methods can include applying to the soil an effective amount of a composition containing the extruded fertilizer granule of the present invention. The method may include increasing the growth and yield of crops, trees, ornamentals, etc. such as, for example, palm, coconut, rice, wheat, corn, barley, oats, and soybeans. The method can include applying extruded fertilizer granules of the present invention to at least one of a soil, an organism, a liquid carrier, a liquid solvent, etc.

Non-limiting examples of plants that can benefit from the fertilizer of the present invention include vines, trees, shrubs, stalked plants, ferns, etc. The plants may include orchard crops, vines, ornamental plants, food crops, timber, and harvested plants. The plants may include Gymnosperms, Angiosperms, and/or Pteridophytes. The Gymnosperms may include plants from the Araucariaceae, Cupressaceae, Pinaceae, Podocarpaceae, Sciadopitaceae, Taxaceae, Cycadaceae, and Ginkgoaceae families. The Angiosperms may include plants from the Aceraceae, Agavaceae, Anacardiaceae, Annonaceae, Apocynaceae, Aquifoliaceae, Araliaceae, Arecaceae, Asphodelaceae, Asteraceae, Berberidaceae, Betulaceae, Bignoniaceae, Bomb acaceae, Boraginaceae, Burseraceae, Buxaceae, Canellaceae, Cannabaceae, Capparidaceae, Caprifoliaceae, Caricaceae, Casuarinaceae, Celastraceae, Cercidiphyllaceae, Chrysobalanaceae, Clusiaceae, Combretaceae, Cornaceae, Cyrillaceae, Davidsoniaceae, Ebenaceae, Elaeagnaceae, Ericaceae, Euphorbiaceae, Fabaceae, Fagaceae, Grossulariaceae, Hamamelidaceae, Hippocastanaceae, Illiciaceae, Juglandaceae, Lauraceae, Lecythidaceae, Lythraceae, Magnoliaceae, Malpighiaceae, Malvaceae, Melastomataceae, Meliaceae, Moraceae, Moringaceae, Muntingiaceae, Myoporaceae, Myricaceae, Myrsinaceae, Myrtaceae, Nothofagaceae, Nyctaginaceae, Nyssaceae, Olacaceae, Oleaceae, Oxalidaceae, Pandanaceae, Papaveraceae, Phyllanthaceae, Pittosporaceae, Platanaceae, Poaceae, Polygonaceae, Proteaceae, Punicaceae, Rhamnaceae, Rhizophoraceae, Rosaceae, Rubiaceae, Rutaceae, Salicaceae, Sapindaceae, Sapotaceae, Simaroubaceae, Solanaceae, Staphyleaceae, Sterculiaceae, Strelitziaceae, Styracaceae, Surianaceae, Symplocaceae, Tamaricaceae, Theaceae, Theophrastaceae, Thymelaeaceae, Tiliaceae, Ulmaceae, Verbenaceae, and/or Vitaceae family.

The effectiveness of compositions containing the extruded fertilizer granules of the present invention can be ascertained by measuring the amount of nitrogen in the soil at various times after applying the fertilizer composition to the soil. It is understood that different soils have different characteristics, which can affect the stability of the nitrogen in the soil. The effectiveness of a fertilizer composition can also be directly compared to other fertilizer compositions by doing a side-by-side comparison in the same soil under the same conditions. Compositions containing the fertilizer granules described herein can be compared directly to such fertilizers as AGROTAIN® or SUPERU®. AGROTAIN® is sold by Koch Fertilizer, LLC and is an NBTPT-containing liquid formulation, with N-methyl-2-pyrrolidone (NMP) as the main solvent along with other additives to allow for spreading of this liquid onto urea granules, generally at the fertilization site. Thus, it requires an additional step before being applied to the soil/organism and incorporates the toxic solvent NMP. Tremendous odor is evident during usage. SUPERU® is sold by Koch Fertilizer, LLC and is a formulation of urea containing both NBTPT and DCD prepared by adding these two inhibitors to a urea melt during granulation.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Methods of Making Extruded Fertilizer Granules

Representative procedure for lab scale extruder: The materials needed for formulations were weighed to the nearest accuracy and mixed thoroughly. The compounding operations were carried out in a co-rotating twin screw extruder with 6-barrels. The experiments were carried out at a processing temperature ranging from 40° C. to 65° C. The temperature of the extrusion process can be controlled by the screw speed used in the extrusion process. Screw speed was 200 rpm and the material output was 10 kg/hr. 3 mm extrudates were collected out of the die at the end of the extruder in a tray and allowed to cool.

Formulations containing urea powder and one or more nitrification or urease inhibitor(s) were produced by this procedure. Table 1 contains materials and amounts of some of the formulations produced.

TABLE 1

| Formulation | PEG 6000 (wt. %) | Urea powder (wt. %) | NBTPT (wt. %) | DCD (wt. %) |
|---|---|---|---|---|
| A | 20 | 77.8 | 2.2 | — |
| B | 30 | 67.8 | 2.2 | — |
| C | 30 | 60 | — | 10 |
| D | 30 | 57.8 | 2.2 | 10 |

Example 2 (Prophetic Example)

Sample Analysis

Properties of the fertilizers disclosed herein can be tested. The purity of the components can be cross-checked by NMR, HPLC, and LCMS analysis. Crush strength can be measured for some of the samples using a crush strength analyzer to determine the strength of the extrudates fertilizer granules. The stability of inhibitors in the extrudate and/or blended fertilizers can be measured using HPLC and LCMS. The free and total moisture content of extrudates can be measured using a moisture analyzer.

The nitrogen volatilization and nitrogen transformation (nitrification) can be measured in different soils and compared to urea alone and to products on the market such as AGROTAIN®, ESN®, and SUPERU®. A soil that is representative of a broader class of soil types can be used to measure the nitrogen volatilization and nitrification. Greenville soil and Crowley soil are two such representative soils. Other soils may also be used for the experiments described herein.

Greenville soil or Greenville clay-loam soil is typical of weathered tropical ultisols and is found in warm humid environments. The soil is classified as fine, kaolinitic, thermic Rhodic Kandiudults with a pH of 6.1-6. The soil has organic matter of 1.4%, total amount of nitrogen is about 0.06%, and the cation exchange capacity (CEC) is 5.2 centimoles/kilogram (cmol/kg). Accordingly, the soil has a low content of organic matter, and also low availability of sulfur and nitrogen. Thus, the soil is ideal for nitrogen and sulfur trials with fertilizers.

Crowley soil consists of very deep, somewhat poorly drained, very slowly permeable soils that formed in clayey fluviomarine deposits of the Pleistocene age. The soil exists in nearly level to very gently sloping soils and occurs on flat coastal plains terraces. The slope is dominantly less than 1 percent but ranges to up to 3 percent. The mean annual precipitation is about 1549 mm (61 in.), and the mean annual air temperature is about 20 degrees C. (68° F.), where the soil is found. The soil is fine, smectitic, and thermic Typic Albaqualfs.

The nitrogen volatilization of various exemplary samples of fertilizer granules as compared to AGROTAIN® (KOCH Agronomic Services, U.S.A.), ESN® (Agrium, U.S.A), and SUPERU® (KOCH Agronomic Services, U.S.A.), and urea can be determined as the percentage of nitrogen loss via ammonia volatilization as compared to the amount of nitrogen applied or as the absolute mass of nitrogen lost via ammonia volatilization.

The invention claimed is:

1. An extruded fertilizer granule comprising an extrudate having:
    solid urea;
    one or more nitrification or urease inhibitor(s) or a combination thereof; and
    a polymeric binder having a melting point of less than 80° C., the polymeric binder comprising 20 wt. % to 30 wt. % of one or more of polyethylene glycol, polycaprolactone, or a combination of polyethylene glycol and polycaprolactone, where the wt. % is based on the weight of the fertilizer granule,
    wherein the extrudate is bound together by the polymeric binder and the extruded fertilizer granule does not contain a coating on the extrudate.

2. The extruded fertilizer granule of claim 1, wherein the extrudate comprises by weight of the extrudate:
    40 wt. % to 80 wt. % of the solid urea;
    20 wt. % to 40 wt. % of the binder; and
    0.02 wt. % to 10 wt. % of one or more nitrification and/or urease inhibitor(s).

3. The extruded fertilizer granule of claim 1, wherein the extrudate comprises:
    0.02 wt. % to 0.5 wt. % of the urease inhibitor; and/or
    0.5 wt. % to 10 wt. % of the nitrification inhibitor.

4. The extruded fertilizer granule of claim 1, wherein at least one of the urease inhibitor(s) comprises N-(n-butyl) thiophosphoric triamide and/or wherein at least one of the nitrification inhibitor(s) comprises dicyandiamide.

5. The extruded fertilizer granule of claim 1, wherein the polymeric binder is biodegradable and/or water soluble.

6. The extruded fertilizer granule of claim 1, wherein the solid urea is powdered urea.

7. The extruded fertilizer granule of claim 1, further comprising micronutrients.

8. The extruded fertilizer granule of claim 1, wherein the extrudate has a diameter of 1 mm to 4 mm.

9. The extruded fertilizer granule of claim 1, wherein the polymeric binder is polyethylene glycol.

10. A fertilizer composition comprising a mixture of:
    (a) urea granules; and
    (b) a plurality of the extruded fertilizer granules of claim 1.

11. A process for producing a fertilizer, the process comprising:

extruding a composition comprising solid urea, a polymeric binder having a melting point of less than 80° C., and one or more nitrification or urease inhibitor(s) or a combination thereof at an extrusion temperature sufficient to melt the polymeric binder and form an extrudate that is bound together by the polymeric binder; and forming a fertilizer granule from the extrudate, wherein the polymeric binder comprises 20 wt. % to 30 wt. % of one or more of polyethylene glycol, polycaprolactone, or a combination of polyethylene glycol and polycaprolactone, where the wt. % is based on the weight of the fertilizer granule.

12. The process for producing a fertilizer of claim 11, wherein the extrudate comprises:
40 wt. % to 80 wt. % of the solid urea;
20 wt. % to 40 wt. % of the polymeric binder; and
0.02 wt. % to 10 wt. % of one or more nitrification and/or urease inhibitor(s).

13. The process for producing a fertilizer of claim 11, wherein the extrudate comprises:
0.02 wt. % to 0.5 wt. % of the urease inhibitor; and/or
0.5 wt. % to 10 wt. % of the nitrification inhibitor.

14. The process for producing a fertilizer of claim 11, wherein at least one of the urease inhibitor(s) comprises N-(n-butyl) thiophosphoric triamide and/or wherein at least one of the nitrification inhibitor(s) comprises dicyandiamide.

15. The process for producing a fertilizer of claim 11, wherein the polymeric binder is biodegradable and/or water soluble.

16. The process for producing a fertilizer of claim 11, wherein the solid urea is powdered urea.

17. The process for producing a fertilizer of claim 11, wherein the fertilizer granule has an average diameter of 1 mm to 4 mm.

18. The process for producing a fertilizer of claim 11, wherein:
the extrusion temperature is less than 80° C.; and
the extrudate is extruded from a co-rotating twin screw extruder.

19. The process for producing a fertilizer of claim 11, further comprising combining a plurality of the fertilizer granules with added urea granules to form a blended fertilizer such that the added urea granules are not bound in the extrudate of the fertilizer granules.

20. The process for producing a fertilizer of claim 11, wherein the polymeric binder is polyethylene glycol.

\* \* \* \* \*